No. 641,975. Patented Jan. 23, 1900.
R. W. KIRBY.
COTTON CHOPPER.
(Application filed Oct. 4, 1899.)
(No Model.) 2 Sheets—Sheet 1.
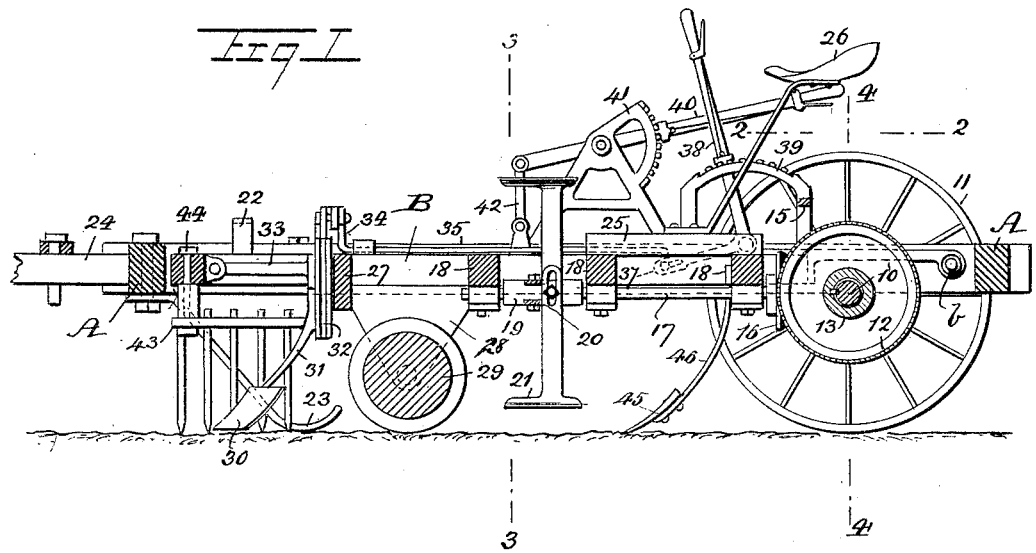
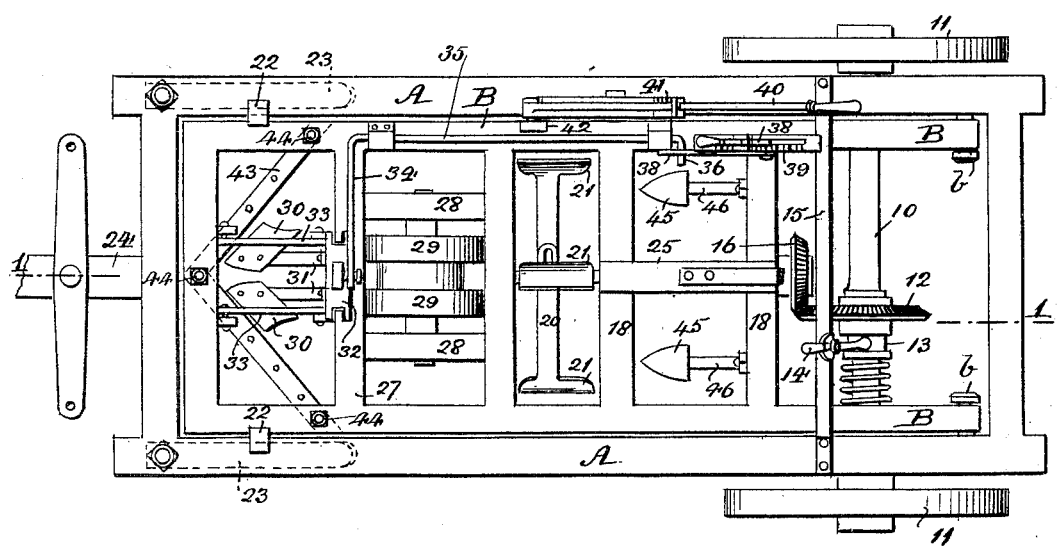
WITNESSES:
H. Walker
INVENTOR
R. W. Kirby
BY
ATTORNEYS

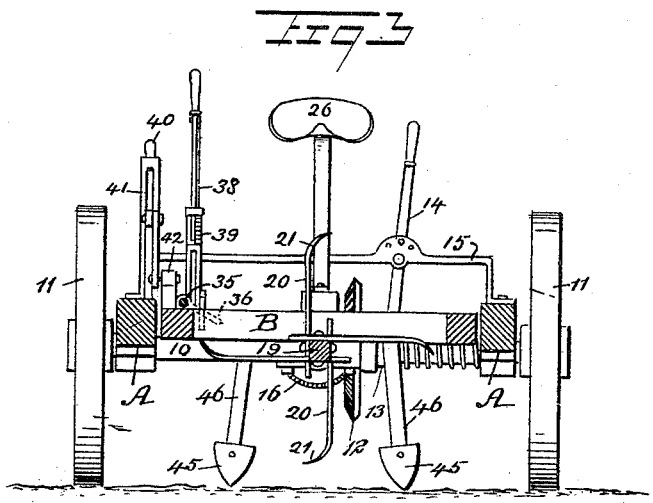
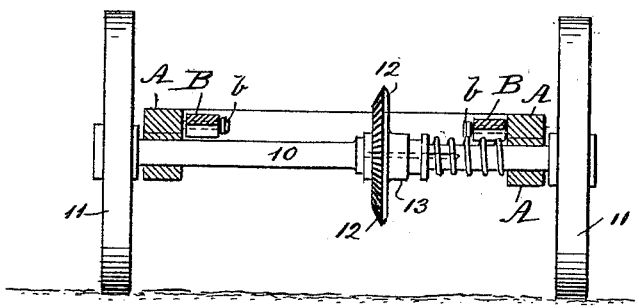

UNITED STATES PATENT OFFICE.

RICHARD W. KIRBY, OF COOKVILLE, TEXAS.

COTTON-CHOPPER.

SPECIFICATION forming part of Letters Patent No. 641,975, dated January 23, 1900.

Application filed October 4, 1899. Serial No. 732,493. (No model.)

*To all whom it may concern:*

Be it known that I, RICHARD W. KIRBY, of Cookville, in the county of Titus and State of Texas, have invented a new and Improved Cotton-Chopper, of which the following is a full, clear, and exact description.

One object of my invention is to provide a machine especially adapted for chopping cotton and in which the various working parts may be collectively raised and lowered to pass an obstruction or when the machine is in transit to or from a field or is turning corners.

Another object of the invention is to provide scrapers in advance of the choppers adjustably mounted so that they regulate the depth of the cuts and to interpose rollers between the choppers and the scrapers, which rollers are arranged to travel in the furrows formed by the scrapers, and thus cause the choppers to rise and fall according to the character of the ground.

Another object of the invention is to provide cultivator-blades at the rear of the choppers adapted to travel in the space between rows, and, further, to provide the machine with a removable rake located in advance of the scrapers and adapted to clear chaff and stalks from the path of the scrapers.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical longitudinal section through the machine, the section being taken practically on the line 1 1 of Fig. 2. Fig. 2 is a plan view of the machine, the seat-standard being in section and the section being taken on the line 2 2 of Fig. 1. Fig. 3 is a transverse vertical section taken substantially on the line 3 3 of Fig. 1, and Fig. 4 is a vertical transverse section taken substantially on the line 4 4 of Fig. 1.

The main frame A is of skeleton formation and usually rectangular in shape. An axle 10 is held to turn in suitable bearings at the rear end of the frame, and supporting-wheels 11 are mounted on the spindles of the said axle.

A bevel-gear 12 is mounted to slide on the axle 10 and revolve therewith, the said bevel-gear to that end being provided with a spring-controlled sleeve 13, engaged by a shifting lever 14, suitably mounted on a support 15, that usually extends from side to side of the main frame A.

An auxiliary frame B is loosely mounted in the main frame A, the rear portion of the auxiliary frame being attached to the main frame by pivots *b* or their equivalents. The bevel-gear 12 is adapted to normally mesh with a second bevel-gear 16, secured upon a longitudinal shaft 17, journaled in bearings attached to cross-bars 18, carried by the auxiliary frame B. A polygonal hub 19 is secured to the shaft 17 between the intermediate or forward cross-bars 18, as shown in Figs. 1 and 3, and arms 20 are adjustably secured to the faces of the said hub. Each arm terminates at its outer end in a hoe-blade 21. The hub, arms, and blades constitute the chopping device.

The auxiliary frame B is held normally in a horizontal position by stops 22, which engage with the main frame, as shown in Figs. 1 and 2, and when the auxiliary frame B is raised the gear 16 will be carried out of mesh with the gear 12, and consequently the chopping device will cease to operate.

The machine is assisted in turning corners by attaching to the front thereof at each side runners or trailers 23, which normally have a downward and rearward inclination, their rear ends being upwardly turned, and these runners or trailers 23 are pivoted to the main frame, so that they are free to turn in any direction. The main frame A is also provided with a pole 24 or other form of draft device. A longitudinal bar 25 is usually supported on the rear cross-bars 18 of the auxiliary frame B, and this longitudinal bar 25 in its turn supports the standard of the driver's seat 26. A forward cross-bar 27 is provided for the auxiliary frame B, and hangers 28 are located between the forward cross-bar 27 and adjacent cross-bar 18, the said hangers receiving the trunnions of connected rollers 29, and the hoes 21 of the chopper strike the ground at the rear of the space between the said rollers. The rollers 29 follow immediately behind scrapers 30, which scrapers are at angles to each other and incline rearwardly and outwardly, and the shanks 31 of the scrapers are secured to a block 32, held to slide in suitable ways in the cross-bar 27. Arms 33 are attached to the said block and are pivotally connected with the forward portion of the auxiliary frame B, as shown in Figs. 1 and 2. By raising and lowering the scrapers 30 the depth that the hoes enter the ground is regulated, and as the rollers 29 follow immediately behind the said scrapers and in front of the chopping device the rollers travel in the furrows made by the scraper-blades and cause the chopper to rise and fall according to the character of the ground traversed.

The adjustment of the scraper-blades is under the complete control of the driver, as the sliding block 32 is pivotally connected with a crank-arm 34, attached to a shaft 35, which extends rearwardly along the side of the auxiliary frame B and terminates in a rear crank-arm 36, having pivotal and sliding connection with the lower member 37 of an elbow-lever 38, pivoted on the adjustable or auxiliary frame B, and the lever 38 is provided with a suitable thumb-latch for engagement with a rack 39, as shown in Fig. 1. The auxiliary frame B is raised and lowered through the medium of a lever 40, mounted upon the main frame A, being within convenient reach of the driver's seat. This lift-lever 40 is provided with a thumb-latch, also adapted to engage with a suitable rack 41, and the said lever 40 is connected by a link 42 with one side of the auxiliary frame B at or near the center thereof.

It is necessary in trashy ground that some provision should be made to remove the trash or stalks from the path of the scrapers in order that the machine shall not become clogged. This is effected through the medium of an angular rake 43, which is located in front of the scrapers and is removably attached to the front and sides of the auxiliary frame B by bolts 44 or equivalent devices. When the land is free from trash, the rake 43 is dispensed with.

The construction of the machine is completed by the addition of cultivator-blades 45, the shanks 46 whereof are secured to the rear cross-beam 18 of the auxiliary frame, and these cultivator-blades 45 are adapted to enter the ground between the rows of cotton left standing.

Thus, it will be observed, in operation the scrapers clear the ground, the rollers 29 serve as guides for the chopping device, the chopping device is driven from the axle of the machine, and the ground is cultivated after the surplus cotton-plants have been removed.

Having thus described my invention, I claim as new and desire to secure by Letters Patent—

1. In a cotton-chopping machine, a frame, scrapers adjustable vertically in said frame, a chopping device mounted in the frame, means for driving said chopping device, and a roller mounted in the frame between the adjustable scrapers and the chopping device, whereby to adapt the chopping device to the surface of the land over which the machine is drawn.

2. In a cotton-chopper, the combination, with a wheel-supported frame, an auxiliary frame mounted in the main frame, and a lifting device for the auxiliary frame, of scrapers carried by the auxiliary frame, a shaft mounted in the auxiliary frame, means for driving the said shaft from the axle of the main frame, hoes mounted upon the said shaft, and rollers located between the scrapers and hoes, the said rollers being adapted to travel in the furrows formed by the scrapers and adapt the hoes to the surface of the land over which the machine is drawn.

3. In a cotton-chopper, the combination, with a wheel-supported main frame, an auxiliary frame pivoted in the main frame, and means for lifting the auxiliary frame, of scrapers adjustably mounted in the auxiliary frame, a regulating device for the said scrapers, a shaft mounted in the auxiliary frame and driven through connection with the axle of the main frame, choppers carried by the said shaft, and cultivator-blades suspended from the auxiliary frame, and arranged to travel in the spaces between the furrows, as described.

4. In a cotton-chopper, the combination, with a wheel-supported main frame, the axle whereof is provided with an adjustable driving-wheel, an auxiliary frame pivoted in the main frame, a shaft carried by the auxiliary frame, receiving motion from the driving-wheel of the axle of the main frame, hoes carried by the said shaft, vertically-adjustable scrapers also carried by the auxiliary frame, a lever arranged to raise and lower the said scrapers, cultivator-blades located at the rear of the said hoes, and rollers located in front of the hoes and at the rear of the said scrapers, the said rollers being adapted to travel in the track of the scrapers, and means for raising and lowering the auxiliary frame, as and for the purpose described.

5. In a cotton-chopper, the combination with a main frame, an axle mounted at the rear of the main frame, supporting-wheels carried by the axle, and pivoted trailers located at the forward portion of the main frame, an auxiliary frame pivoted to the main frame, and means for raising and lowering the auxiliary frame, of a shaft mounted in the auxiliary frame, means for driving said shaft from the axle of the main frame, choppers carried by the said shaft, cultivator-blades located at the rear of the said choppers and attached to said auxiliary frame, scrapers located in advance of the choppers, a sliding support for the said scrapers, which support is mounted in the auxiliary frame, means for raising and lowering the said supports for the scrapers, and rollers located between the scrapers and the choppers and adapted to travel in the track of the said scrapers, as described.

6. In a cotton-chopper, the combination, with a main frame, an axle mounted at the rear of the said main frame, supporting-wheels carried by the said axle, and pivoted trailers located at the forward portion of the main frame, an auxiliary frame pivoted to the main frame, and means for raising and lowering the said auxiliary frame, of a shaft mounted in the auxiliary frame, means for driving the said shaft from the axle of the main frame, choppers carried by the said shaft, cultivator-blades located at the rear of the choppers and attached to the auxiliary frame, scrapers located in advance of the choppers, a sliding support for said scrapers, which support is mounted in the said auxiliary frame, means for raising and lowering the said supports for the scrapers, rollers located between the scrapers and the choppers and adapted to travel in the track of the said scrapers, and a rake detachably connected to the said auxiliary frame in advance of the said scrapers, for the purpose set forth.

7. In a cotton-chopping machine, a wheel-supported frame, an auxiliary frame pivoted at its rear end in said frame and having means attached to its front end for raising it, scrapers and choppers supported by said frame, the former being in advance of the latter, and a roller supported by said frame and located between the scrapers and the choppers, said roller being adapted to follow in the furrow made by the scrapers whereby to control the elevation of the choppers.

In testimony whereof I have signed my name to this specification in the presence of two subscribing witnesses.

RICHARD W. KIRBY.

Witnesses:
E. V. BROADSTREET,
LAFAYETTE REYNOLDS.